455-611 AU 233 EX
FIP8106 XR 3,242,805

CROSS REFERENCE EXAMINER

March 29, 1966 N. J. HARRICK 3,242,805

SEMICONDUCTOR LIGHT MODULATOR OR DETECTOR

Filed March 26, 1962 3 Sheets-Sheet 1

H 9-15-61

Modulator

INVENTOR.
N.J. HARRICK

BY Frank R. Trifari
AGENT

INVENTOR.
N.J. HARRICK

BY

Frank R. Trifari
AGENT

March 29, 1966 N. J. HARRICK 3,242,805

SEMICONDUCTOR LIGHT MODULATOR OR DETECTOR

Filed March 26, 1962 3 Sheets-Sheet 3

INVENTOR.
N.J. HARRICK

BY Frank R. Trifari
AGENT

3,242,805
SEMICONDUCTOR LIGHT MODULATOR OR DETECTOR

Nicolas J. Harrick, Ossining, N.Y., assignor to North American Philips Company, Inc., New York, N.Y., a corporation of Delaware Filed Mar. 26, 1962, Ser. No. 182,606
Claims priority, application Netherlands, Sept. 15, 1961, 269,289
14 Claims. (Cl. 88—61)

My invention relates to semiconductor devices useful in conjunction with electromagnetic radiation. An important application of my device is for modulating a beam of radiation, such as an infrared or light beam.

It is known to modulate light passing through a semiconductive body by varying its free carrier density, which changes the absorption of the light beam. U.S. Patents 2,692,952 and 2,776,367 describe typical prior art devices employing minority carrier injection by means of a p-n junction to vary the free carrier density in the semiconductive body region through which the light beam passes. The major drawback of such devices is their low modulation rate. A rate greater than one megacycle per second is not easily achieved. This is a consequence of the long lifetimes of these minority carriers and transit time effects. With the advent of the laser and the possibility of communication in the optical spectrum, it would be highly desirable to be able to modulate at much higher rates.

I have found it possible to increase substantially the modulation rate with a semiconductor device by utilizing primarily majority carriers in the semiconductive body for absorbing the radiation photons. The only restriction on majority carriers is their relaxation time, a time generally less than $10^{-11}$ seconds in most semiconductors. Thus modulation rates up to frequencies of thousands of megacycles per second can be achieved.

In accordance with my invention, I vary the free carrier density of majority carriers in a space charge region of the semiconductive body. A "space charge region" is defined, as the name implies, as a region of the semiconductive body where charge neutrality is not maintained. It is established by an electric field in a region of the body. One construction for achieving this is with a field plate, a conducting electrode, separated by a dielectric from a surface layer of the semiconductor. A potential applied across the dielectric by the field plate would then charge the semiconductor layer, and this charge alters the free carrier density in the surface layer and thus the absorption of photons traversing the layer. The space charge region is very thin, of the order of one micron. To ensure that the radiation beam traverses this thin layer, I prefer to direct the beam through the semiconductor at the surface where the space charge region is established at an angle greater than the critical angle for the semiconductor-dielectric interface so that the radiation beam is totally reflected from the surface to continue through the body. In this way I ensure that the beam is subjected to the absorbing ability of the excess majority carriers in the space charge region. By employing a suitable geometry of the semiconductor body, I can obtain multiple reflections of the beam and multiple traversals of the space charge regions, which multiplies the absorption and the degree of modulation attainable. Varying the potential applied to the field plate in turn varies the absorption of the radiation traversing the space charge region. I also contemplate other arrangements for varying the carrier density in a space charge region in the semiconductor, such as by employing an electromagnetic wave.

A modified modulator employing a different principle is also part of my invention. It is known that a beam of radiation traversing a denser medium and impinging on a surface at an angle greater than the critical angle apparently is totally reflected, but that in actual fact the beam penetrates into the rarer medium and then reenters the denser medium. If the rarer medium absorbs photons, then the total reflection is frustrated and is less than complete. I have found that added free carriers in the space charge region tend to lower the index of refraction of the semiconductor near the surface, which has the effect of shifting the plane of reflection of the beam inside the body. This changes the depth of penetration of the beam into the rarer medium, which, by suitable construction, can be employed to vary the absorption of the beam. In this modification, the absorption takes place in the medium adjacent the semiconductor surface on which the beam is incident, and is not free carrier absorption.

In the above embodiments, a beam of radiation has its intensity varied by causing the beam to traverse a space charge region in the semiconductor. A similar structure is useful as a detector for indicating the presence and intensity of the beam. The principle utilized is photoconductivity from semiconductor surface states, and the region of the semiconductor whose conductivity is altered is the space charge region. A very high detection sensitivity is obtained with extremely fast response.

The invention will now be described in detail in connection with the accompanying drawing wherein.

Figure 1:
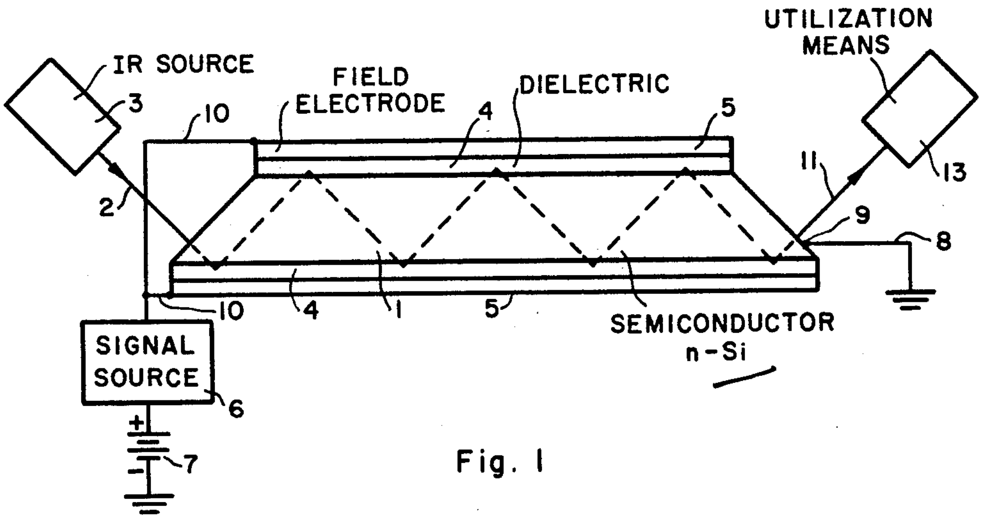
FIG. 1 is a partly diagrammatic view of a free carrier absorption modulator in accordance with my invention.

FIG. 1 illustrates a device in accordance with my invention for modulating an infrared beam of radiation. The device comprises a semiconductive body 1 substantially transparent to the infrared radiation, which means that the crystal lattice of the body contributes as little as possible, and preferably not at all, to the absorption of the infrared photons. For this reason, the body is preferably a single crystal of high quality, as crystal imperfections or deviations tend to increase the body absorption. The shortest wave length of radiation for which the body is transparent is determined by its absorption edge. For germanium, this is 2 microns; for silicon, 1 micron; and for zinc oxide, 0.35 micron. Silicon has been used in a device actually reduced to practice. The range of wavelengths that can be modulated wtih germanium, for example, is between 2 microns and about 25 microns.

The semiconductive body 1 is given a geometry permitting multiple internal reflection of an incident infrared beam 2, originating from an external source 3. The source 3 may be any known generator of infrared radiation such as an intense light source with an infrared-transparent filter, or a laser which generates in the infrared region. Preferably, the beam 2 consists of parallel rays, or is collimated, to prevent undue dispersion. As shown, the semiconductive body has the form of a thin slab with a trapezoidal cross-section (its height is exaggerated in the drawing for clarity). For example, it may have length of 50 mms., a height of .5 mm., and a width, the dimension into the plane of the drawing, of about 10 mms.

The ends are cut at a 45° angle. All of the surfaces are finely polished as carefully as possible. A final polish with one micron diamond grit proved satisfactory. It is followed by mild etching to remove the damaged areas.

Smooth surfaces are thus obtained to minimize scattering. Electro-polishing techniques to provide a mirror finish are known for this purpose.

As will be recalled from the previous discussion, free majority charge carriers, rather than minority charge carriers, are utilized to absorb the radiation photons. In this way, a frequency limitation associated with the prior art device is extended by at least several orders of magnitude. It is therefore necessary to ensure that the majority of carriers play the major absorption role. To this end, the region of the body wherein absorption will take place should possess a sufficiently high concentration of majority carriers to enable a range of variation or control to be achieved which will cause appreciable modulation of the beam. If during this swing the majority concentration falls too low, then the minority carriers will begin appreciably to affect the total absorption with its concommitant disadvantage. A minimum majority carrier density of $10^8$ carriers/cm.$^2$ in excess of intrinsic in the surface layer is preferred.

It is also important that the majority carrier concentration in the surface layer where the absorption will take place should also always have a larger majority carrier concentration than the bulk of the body even during the maximum concentration variation. To ensure this result, the semiconductive body employed in the inventive device preferably has an increased majority carrier concentration in the surface region where the absorption is to occur. This is attained by providing additional conductivity-determining impurities, by well-known techniques in the semiconductor art, in the surface layers. Hence, if the bulk of the body is p-type, the surface should be p+. If the bulk is n-type, the surface should be n+. In a preferred arrangement, the body surface layers where absorption is to occur, to a depth of the order of one micron, contains about $10^8$ to $10^{13}$ per square centimeter more majority carriers than the underlying portions of the body where the concentration is unchanged. To ensure adequate modulation, the majority carrier concentration in the surface region is preferably varied between concentration values equal to and higher than that in the semiconductor bulk, as will be hereinafter explained in more detail.

The surface regions wherein the absorption will occur are at the major surfaces of the semiconductive slab 1. A space charge region is to be provided thereat, and to this end, the opposed major surfaces are furnished with a dielectric or insulating coating 4. A suitable coating is silicon dioxide. This can be produced by anodic oxidation, as is well-known in the art. Alternatively, an insulating material may be applied on the major surfaces, such as a lacquer, or other high dielectric constant synthetic resin. An anodically grown oxide layer about 5000 A. thick has proved satisfactory.

In order to charge up surface layers of the semiconductive slab 1, means are provided for establishing an electric field thereat. In the embodiment illustrated in FIG. 1, a conductive member 5 serving as a field electrode or field plate is applied on the dielectric layers 4. The field plate may be a metal layer formed by vaporization or it simply may be a conductive plate pressed tightly against the dielectric. The two field electrodes 5 are interconnected to a modulating signal source 6, to which is also connected a biasing potential source 7, which is grounded. The circuit is completed by a ground connection to the semiconductive slab 1, as at 8.

The infrared beam 2 is directed through the semiconductive slab 1 so as to strike the interface with the dielectric layer 4 at an angle greater than the critical angle, given by the well-known formula $\theta_c=\sin^{-1} N_2/N_1$, where $\theta_c$ is the critical angle in degrees and $N_2$ and $N_1$ are the indices of refraction, respectively, of the denser and rarer mediums, in this case the semiconductor and dielectric. For a silicon-oxide interface, the critical angle is 23°. So long as the angle of incidence of the infrared beam exceeds the critical angle, total reflection of the beam will occur. By appropriate geometry of the slab, it can be insured that the beam will totally reflect on the opposite interface also, resulting in multiple reflections from the major surfaces until the beam reaches the opposite end where, being essentially normally incident on that last end surface it will leave the body. By this mechanism, it is thus ensured that the beam will repeatedly traverse a thin surface layer of the semiconductor slab where a space charge region is present.

Now, it is known that, in actual fact, the beam is not wholly confined within the semiconductor but actually penetrates into the rarer medium or dielectric at each reflection to a depth of about one-tenth wavelength or greater. Where the rarer medium is absorbent, frustrated total reflection occurs, which means that the reflected beam has a reduced intensity equal to the absorption in the rarer medium. Since this simply constitutes a background absorption not connected with the modulation frequency, it is undesirable and should be avoided by choosing a dielectric which is non-absorbent or substantially transparent for the radiation beam. The silicon dioxide meets this requirement.

When a voltage is applied to the field plates 5, which is, say, positive, then a negative charge is induced in the opposite surface layer of the semiconductor. It will be observed that the structure is the equivalent of a capacitor with the field plates and the semiconductor serving as the capacitor electrodes and the dielectric layer as the capacitor dielectric. Therefore, if the field plates are positively charged by the applied positive voltage, it will be balanced by a negative charge in a semiconductor surface layer. The absence of charge neutrality means the presence of a space charge region, which generally extends of the order of a micron into the semiconductor depending upon the applied voltage and its conductivity. The carriers required to establish this charged region of the semiconductor come from the bulk of the body, which is always electrically neutral so that any charge deficiency therein is made up by the flow of carriers into the bulk via the ground connection, again analogous to the simple charging of a capacitor. The insulation of the dielectric, of course, prevents this charge from being neutralized. The charged surface layer results from majority carriers either being provided in excess in the surface layer or being withdrawn from the surface layer. As indicated earlier this can be done extremely rapidly since the only limiting property is its relaxation time which is extremely short. It will thus be seen that, by the application of the positive potential to the field electrode, a negatively charged surface region in the semiconductor is established. If the semiconductor is n-type, this means then that the number of free electrons in the surface layer in this charge condition are greater than the number present in the uncharged condition. Similarly, if a less positive potential is applied to the field plate, then a less negative charge is induced in the semiconductive surface layer, which means that less free electrons are present. Thus, the free majority carrier concentration in the semiconductor surface layer or space charge region will follow the potential of the opposed field plate. Changes in the free carrier density change absorption of the infrared beam as it traverses this space charge region. Thus, the beam intensity will vary in accordance with the beam potential applied to the field plate.

To reduce the background absorption, it is desirable that any absorption in the semi-conductor bulk is minimized. This requires, therefore, high resistance or near intrinsic material. However, as pointed out earlier, it is essential to minimize the role played by minority carriers to extend the frequency capabilities of the device.

Therefore, the bulk should have some conductivity so that it can readily supply the majority carriers demanded by the space charge region. For this reason, also, as pointed out above, the surface layers are given a higher conductivity than the bulk. To ensure that the conductivity of the space charge region never falls below the bulk, the device may be initially biased by a fixed potential source 7 and the signal strength related to the biasing potential value to ensure that the majority carrier concentration in the bulk varies only between its normal concentration and an excess carrier concentration. This is analogous to biasing the grid electrode of a triode amplifier to prevent the signal voltage swing from driving the grid positive.

How the concentration of majority charge carriers in the surface layer though varied is maintained above the intrinsic concentration and preferably above the concentration of majority charge carriers in the semiconductive body interior may be illustrated in FIGS. 6 to 10. In these graphs, along the ordinate is plotted the concentration of majority charge carriers in the surface region or space charge layer, and along the abscissa is plotted time. The numeral 60 designates the concentration of majority charge carriers in the bulk or interior of the body, and the X-axis is the intrinsic concentration. If the majority carrier concentration in the surface layer is controlled or varied as shown by the curve 61 of FIG. 6, it becomes very small for a large part of the control time, so that, in addition, the concentration of minority carriers is varied and a restriction in frequency is involved. This is due to the fact that, as stated above, disturbances of the quasi-neutrality of the semiconductive body are obviated within the relaxation time of the majority carriers, but when an appreciable increase in the concentration of the minority carriers occurs in the space charge region, there is also an increase (according to the Boltzmann relationship) in the bulk, which is compensated by the inflow of majority carriers available in much greater numbers, so that an increase in the total concentration of the charge carriers is produced (injection), which is maintained for a time depending upon the lifetime of the minority carriers, which is long and thus results in the limited frequency response. Therefore, the control or signal voltage applied must have a smaller amplitude, so that concentration variations are obtained as indicated by the curve 62 in FIG. 7, or the control must be carried out completely in excess of the concentration of majority carriers in the remainder of the semi-conductor body, as is indicated by the curve 63 in FIG. 8, by applying a biasing potential to the field plate, which would be positive if the semi-conductor body is n-type.

The latter possibility can only be employed if there are no slow surface states on the surface of the semi-conductive body, since it has been found that slow surface states cause the concentration of majority charge carriers to fluctuate during the control for some time about the equilibrium concentration prevailing without control. Thus a concentration variation of the kind indicated by the curve 63 in FIG. 8 changes, after some time, into a concentration variation of the kind indicated by the curve 61 in FIG. 6, so that with high concentration variations the risk of excessively low concentrations is again incurred. Such surface states are frequently found in the ordinary semiconductive body, and, moreover, it often has surface layers of opopsite conductivity type or at least with a lower concentration of majority charge carriers than the bulk of the body, due for example to the absorption of impurities from the surroundings. It is therefore advantageous to use a semiconductive body whose surface layer has an increased concentration of majority charge carriers owing to additional impurities therein with control over the concentration of majority charge carriers therein. These undesirable effects are avoided when the surface layer, to a thickness of the order of $1\mu$, has approximately $10^8$ to $10^{13}$ additional majority charge carriers per square centimeter of the surface layer. A concentration variation of $10^8$ charge carriers per $cm.^2$ in the surface layer produces approximately the minimum measurable variation in the absorption of the beam to be modulated, whereas a concentration variation of $10^{13}$ charge carriers per $cm.^2$ in the surface layer is approximately the maximum induceable variation before the electric field becomes so strong that breakdown occurs.

Figure 8:
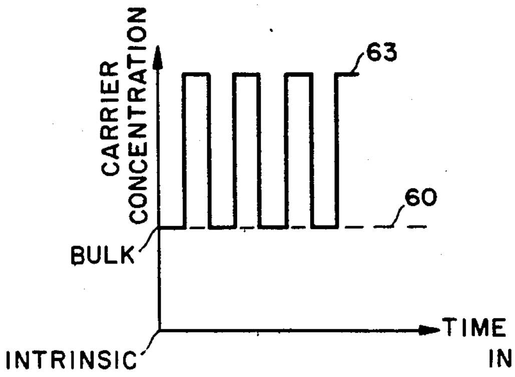
Figure 9:
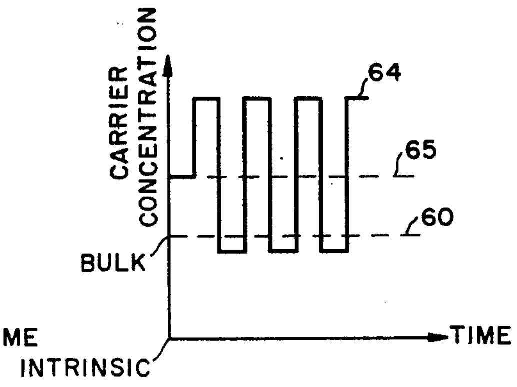
Figure 10:
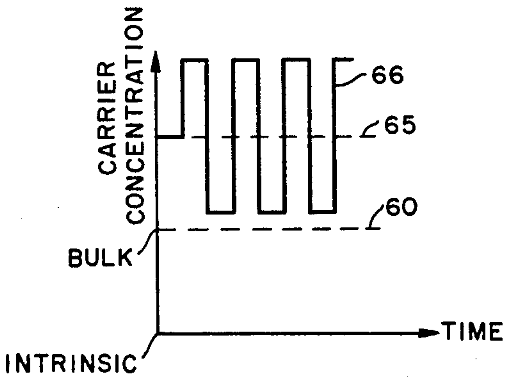

The concentration of majority charge carriers in such a surface layer may be varied as is indicated in FIG. 9 by the curve 64. The dotted line 65 indicates the concentration in the surface layer without an applied signal or control voltage. Preferably, the control is performed in excess of the concentration of majority carriers found in the bulk of the semi-conductor body. This is indicated, by way of example, by the curve 66 in FIG. 10. It is ensured in this case that no inferior concentrations will occur, while the concentrations can be varied up to very high values. With reference to FIG. 8, it is also possible to perform the control from just above the concentration of majority charge carriers in the bulk of the semi-conductor body.

A more detailed description of a suitable device will now be given. The semiconductive body 1 is p-type germanium having an acceptor concentration of $10^{14}$ acceptors per $cm.^3$. The thickness of the body is 0.5 mm. and the length 50 mms. Opposed major surface layers of the body 1 are provided with an additional quantity of carriers of about $10^{12}$ holes per $cm.^2$ of the surface layer. These higher conductivity surface layers may be obtained by applying, by vaporization, about $10^{12}$ acceptor atoms, for example indium atoms, per $cm.^2$ of the surface concerned and heating to produce slight diffusion. The indium penetration should be maintained below about 100 atomic layers. The space charge layer thus obtained has a thickness of the order of $1\mu$. Then to these doped surfaces is applied, by vaporization, a dielectric layer 4 of silicon monoxide, in a thickness of 4000 A. On top of the dielectric layer is applied, by vaporization, an aluminum layer forming field plates 5.

The semiconductive body 1 is furthermore provided, by well-known methods, with an ohmic contact 9. The field plates 5 are provided with connections 10. A beam of infrared rays 2 having a wavelength of, for example, $3\mu$ is reflected at an angle of 45° from the major parallel surfaces of the semiconductive body 1. For the dimensions given, approximately 100 reflections from the opposed surfaces occur before the beam 2 leaves the body 1. The closer the angle of incidence to the critical angle, the greater the degree of modulation.

With an alternating control or signal voltage of 100 v. applied between the field plates 5 and the ohmic connection 9, at a frequency of, for example, 1 mc./sec., an absorption modulation $\Delta I$ of about 10% of the radiated beam 11 intensity $I_t$ may be obtained. This corresponds fairly well to the theoretical value. Theoretically, it can be shown that:

$$\frac{\Delta I}{I_t}=\frac{\Delta P}{C} \qquad (1)$$

wherein $I_t$ is the detected radiated beam intensity in the absence of an applied voltage, $\Delta I$ the beam intensity with an applied voltage, $\Delta P$ the induced variation of the quantity of majority charge carriers per $cm.^2$ of the surface layer, and C a constant, which is about $5\times10^{15}$ for germanium. With a control voltage of 100 v., $\Delta P$ may be expected to be about $5\times10^{12}$ charge carriers per $cm.^2$, which can be calculated from the voltage and the capacitance between the field plate and the semiconductive body. Thus, $$\frac{\Delta I}{I_t}=\frac{5\times10^{12}}{5\times10^{15}}=10^{-3} \text{ per reflection} \qquad (2)$$

In the arrangement shown in FIG. 1, in which 100 reflections occur.

$$\frac{\Delta I}{I_t}=100\times10^{-3}=10^{-1} \qquad (3)$$

so that the modulation is 10% of the non-modulated intensity, which is very satisfactory for such devices. With 50 reflections only, a modulation of 5% is obtained.

While modulation percentages of 5 to 10% of the non-modulated intensity are particularly satisfactory, it may be further enhanced by a suitable choice of materials and geometry, but a most important feature of the device according to the invention is that it is suitable for high frequencies. With, for example, an n-type germanium crystal having a donor concentration of about $10^{16}$ donors per cm.$^3$, the modulation may be readily carried out with a frequency of 10,000 mc./s., since the restricting relaxation time is in this case about $10^{-13}$ sec. At such high frequencies, care should be taken to reduce the capacity between the field plates and the semiconductive body. The modulated radiated beam 11 may be radiated into space to a remote point as part of a communications system, with the modulation containing the intelligence to be transmitted. The utilization means 13 therefor may be a receiver employing an infrared detector for receiving the modulated beam. An indium antimonide photoconductive detector may be employed for the 3 micron infrared radiation described. With high modulation frequencies, a fast detector should be employed.

Figure 2:
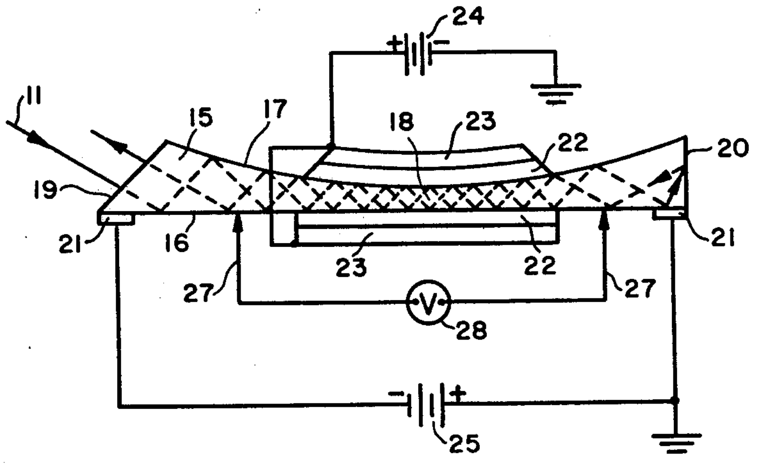
FIG. 2 is a partly diagrammatic view of a radiation detector in accordance with my invention.

As described earlier, a structure similar to that illustrated in FIG. 1 can be utilized as a detector for infrared radiation, which may be conveniently the very same modulated radiation 11 transmitted by the modulator of FIG. 1. A suitable structure is illustrated in FIG. 2. It comprises a semiconductive body 15 in the form of a narrow slab with a flat bottom surface 16 and a concave top surface 17 defining a narrow channel 18 at the center. Preferably high resistance or near-intrinsic material is employed to minimize free carrier conductivity. The entrance face 19 for the radiation 11 to be detected is cut at a 45° angle so that the beam is totally reflected from the semiconductor-air or semiconductor-dielectric interface and is thus confined within the body 15. The opposite end face 20 of the body is cut at right angles, so that the beam is totally reflected off that surface and is reflected back through the body 15 to exit through the surface 19 through which it entered. The beam thus traverses the body twice, increasing the probability that the interaction desired will occur. The wide entrance end and the curved geometry funnels the beam 11 through the narrow channels 18, which may have a thickness of about 0.01 cm. Naturally, the curvature is chosen to ensure that the angle of incidence of the beam at any point on the surface does not fall below the critical angle. Ohmic contacts 21 are made to opposite ends of the body 15. On the top and bottom major surfaces are provided in succession a dielectric layer 22 and an electrode or field plate 23. The field plates 23 are interconnected to ground via a bias source 24. A biasing source 25 is connected between the ohmic contacts 21, one of which is also grounded. Point contacts 27 are made to points of the body lying on opposite sides of the channel 18, and a balanced bridge 28 is connected between the point contacts 27 to measure the voltage.

The phenomenon employed here is radiation excitation of surface states in a semiconductor surface region, the space charge region. The transition is manifested by an increase in conductivity due to the radiation, specifically infrared radiation, freeing absorbed charges trapped in the surface states.

The density of these slow surface states may be from $10^{10}-10^{13}$/cm.$^2$, but by utilizing multiple internal reflection of the radiation, the effective absorption is thereby increased by the number of reflections. The thin channel 18 reduces the dark conductivity of the body and concentrates the light, and thus increases the sensitivity of the detector. The number of reflections is also increased in this manner.

In operation, current is passed through the body 15 from the bias voltage source 25, and the voltage drop across the channel 18 is measured in the absence and presence of the radiation 11. The voltage difference is a measure of the intensity of the incident radiation. As the desirable interaction only occurs at the semiconductor surface, the channel 18 should be kept thin. A surface space charge region may be established by an accumulation layer on the surface, due to impurity absorption, or by an external field. As will be observed, the field plates need not be utilized for this purpose. They are however desirable as a means of increasing the sensitivity of the measurement. This is attained by applying a bias to the field plates 23 to peak the surface state absorption at the wavelength region desired, i.e., the radiation being detected. It may be desirable to chop the incident beam 11. Then, one can employ A.C. techniques, much more sensitive than D.C. techniques, and phase sensitive or synchronous detection.

A feature of this detector is that the detector will respond to wavelengths greater than that corresponding to the lattice absorption edge of the semiconductor material, thereby extending the long wavelength limit of radiation detectable.

In the preceding detector embodiment, photon absorption in a surface state of the semi-conductor was measured. It will be evident that the radiation beam exiting from the device will be reduced in intensity by, among other things, this surface state absorption. The application of an alternating electric field modulates the surface state population and thus the photon absorption. Hence, the exiting beam will have been modulated by the signal from the source 24. Accordingly, the structure illustrated in FIG. 2 can also be employed to modulate a radiation beam. In such case, it is preferred to cause the beam to leave the semiconductor at a surface different from the admitting surface 19.

In the modulator embodiments described above, it will be understood that where plural field plates are provided, different control or signal voltages at different frequencies can be applied to the various field plates with respect to the semiconductive body, so that the modulation imparted to the beam is a mixture of two or more signals, which, as is well-known, is important for many purposes.

The invention is also not restricted to the embodiments described above and many variants are possible. The field plate need not be solid but may be formed by an electrolyte. With a semiconductive body made of silicon and a dielectric layer of silicon monoxide, the field plate may be a liquid electrolyte of N-methylacetamide with 0.04 N potassium nitrate. This electrolyte has the further advantage of anodizing the silicon body, so that weak areas of the oxide layer are automatically repaired or at least maintained insulating by a blocking layer action. Other suitable materials for the dielectric include, for example, air or vacuum, mica, tantalum pentoxide, ceric oxide or strontium titanate.

Figure 3:
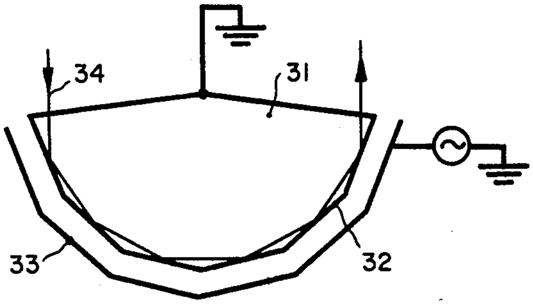
FIGS. 3 and 4 are plan and perspective views, respectively, of different semiconductor geometries providing multiple internal reflection of the beam.
Figure 4:
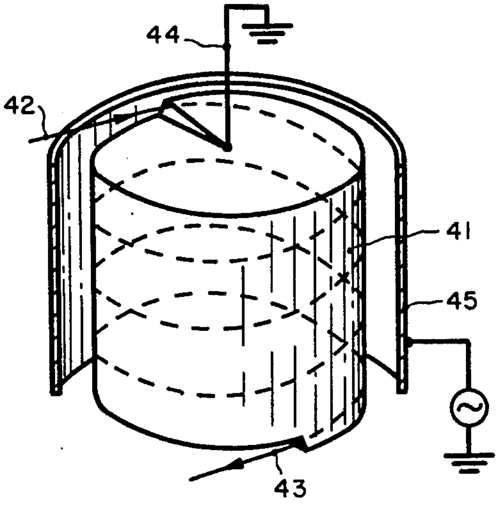

Further, many advantageous shapes of the semiconductor body may be designed to increase the number of internal reflections or control the direction of the exiting beam. FIG. 3 shows by way of example a semiconductive body 31 having a faceted surface 32, opposite to which a field plate 33 is arranged. The incident beam 33 to be modulated is reflected many times from the surfaces 32. FIG. 4 shows an embodiment comprising a cylindrical semiconductive body 41, through which is passed a beam 42 to be modulated, which is repeatedly reflected from the outer surface of the cylinder, so that the beam describes a helix within the body 41 before exiting at the bottom 43. An ohmic contact 44 is made to the axis of the cylinder 41, and a field plate 45 surrounds the cylinder.

Figure 5:
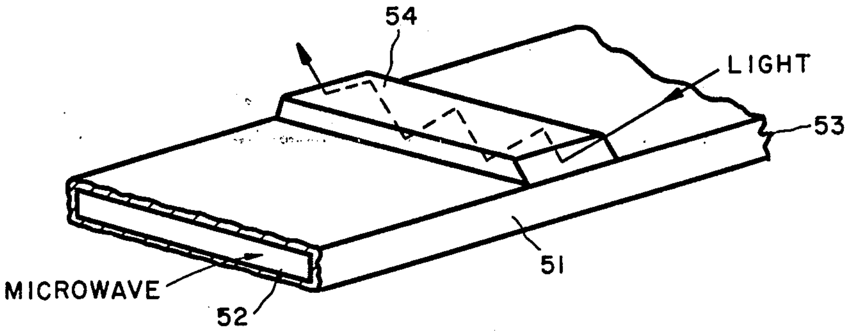
FIG. 5 is a perspective view of a free carrier absorption modulator using microwaves.
Figure 6:
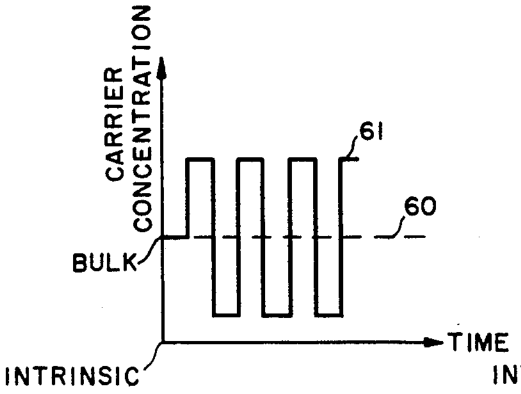
FIGS. 6 to 10 are graphs illustrating the control of the carrier concentration in the space charge region.
Figure 7:
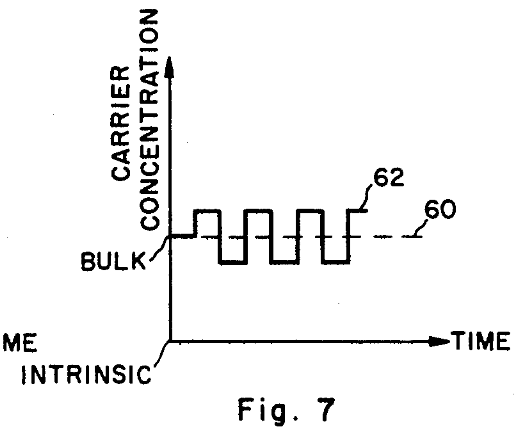

A field plate need not be employed to establish the electric field and space charge region in the semiconductor. FIG. 5 illustrates a modification in which the field of a microwave provides the carrier density variation in the space charge region. This embodiment includes a conventional waveguide 51. A microwave is introduced at one end 52 of the guide, and exits at the opposite end 53. A rectangular section is cut out from the waveguide wall and in its place is inserted a semiconductive slab 54 as illustrated in FIG. 1. The bottom surface of the slab 54 is in the plane of the adjacent waveguide wall portions. All ohmic electrical connection is established between the metallic waveguide 51 and the slab 54, such as by soldering the two together along their junction. The radiation beam 55 to be modulated is directed through the slab as shown by a series of total reflections. The electric field of the microwave, which is a maximum at the long-dimensional wall of the guide, varies the majority carrier density in the space charge region of the slab causing a corresponding variation in the absorption of the beam which thus modulates the exiting beam at the microwave frequency. Pulsed microwaves may be employed to increase the electric field intensity at the semiconductor.

In the preceding embodiments, the photon absorption takes place in the semiconductor by means of free carriers. Now, as discussed above, the infrared beam is not wholly confined within the semiconductive body but actually penetrates slightly into the rarer medium. In the above embodiments, the rarer medium or dielectric is chosen to have a minimum absorption effect on the beam. For example, the silicon monoxide or dioxide used is transparent up to a wavelength of 9 microns. In the modification about to be described, a dielectric is chosen which does absorb the radiation photons. For infrared, a suitable dielectric may be chosen from the class of synthetic resins, e.g., Mylar, etc. Now, I have found that excess free carriers in the space charge region of the semiconductor tend to lower the index of refraction of the semiconductor near the surface. The depth of penetration of the radiation beam measured from the interface depends upon its wavelength. But when the semiconductor refractive index changes, I have observed that the depth of penetration also varies, which is the equivalent of shifting the plane of reflection, normally the interface, inside the body. The larger depth that the beam penetrates into the rarer medium or dielectric, the greater the absorption of the beam. Thus,, with the same geometry illustrated in FIG. 1, but with a dielectric having absorbing power for the beam substituted for the transparent dielectric, I can alter the exiting beam intensity by applying a potential to the field plate. This effect opposes the free carrier absorption described with the other embodiments, which will still be occurring in this embodiment of the invention. However, the latter can be relatively minimized by enhancing the absorption in the dielectric.

While I have described my invention in connection with specific embodiments and applications, other modifications thereof will be readily apparent to those skilled in this art without departing from the spirit and scope of the invention as defined in the appended claims.

What is claimed is:

1. An electrical device for modulating a beam of radiation, comprising a semiconductive body substantially transparent to the said radiation beam and having a receiving surface arranged to admit the said beam to the body interior and a reflecting surface arranged to internally reflect said beam at least once, the body portions adjacent the reflecting surface containing a concentration of majority charge carriers in excess of that present in intrinsic conductivity, means for establishing an electric field and a space charge region within the said body portions adjacent the said reflecting surface, means preventing substantial injection of charge carriers into said body, and means for varying the electric field and thus the majority carrier concentration in the said space charge region to thereby vary the beam intensity as it traverses the space charge region.

2. A device as set forth in claim 1 wherein the body bulk has a given majority charge carrier concentration, and the majority charge carrier concentration in the space charge region is varied between values at least equal to and greater than said given concentration in the bulk.

3. A device as set forth in claim 1 wherein the body portions adjacent the reflecting surface having a higher electrical conductivity than the body bulk.

4. A device as set forth in claim 1 wherein the field-establishing means includes a field plate separated by a dielectric from the reflecting surface.

5. A device as set forth in claim 1 wherein the field-establishing means includes a waveguide.

6. An electrical device for modulating a beam of radiation, comprising a semiconductive body of high resistivity substantially transparent to the said radiation beam and having a receiving surface arranged to admit the said beam to the body interior and plural reflecting surfaces arranged to internally reflect said beam plural times and an exiting surface arranged to allow the multiple-reflected beam to emerge from the body, the body portions adjacent the said reflecting surfaces having a concentration of majority charge carriers which is greater by between $10^8$ and $10^{13}$ per square centimeter than that present in the body interior, a dielectric layer on said reflecting surfaces, a field plate on said dielectric layer and electrically insulated from the reflecting surfaces for establishing an electric field and a space charge region within the said body portions adjacent the said reflecting surfaces, means preventing substantial injection of charge carriers into said body, and means for applying a control voltage between the field plate and the body having a value which causes the majority carrier concentration in the said space charge region to vary only in excess of the intrinsic concentration to thereby vary the beam intensity as it traverses the space charge region.

7. A device as set forth in claim 6 wherein the control voltage has a value at which the majority carrier concentration in the said space charge region is varied only in excess of that present in the body in the absence of an applied voltage.

8. A device as set forth in claim 6 wherein the body is a single crystal and the space charge region has a thickness of the order of one micron.

9. A device as set forth in claim 6 wherein the body has the shape of a thin elongated strip with entrance and exit surfaces at opposite ends, and field plates are provided opposite the major surfaces.

10. A device as set forth in claim 9, wherein different control voltages are applied to the filed plates opposite the major surfaces.

11. An electrical device for modulating a beam of radiation, comprising a semiconductive body substantially transparent to the said radiation beam and having a receiving surface arranged to admit the said beam to the body interior and a reflecting surface arranged to internally reflect said beam at least once, a dielectric material exhibiting absorption of the radiation on the reflecting surface, means for establishing a space charge region within the body at the said reflecting surface, and means for varying the majority carrier concentration in the said space charge region to vary the beam's penetration into the dielectric and thus the beam intensity.

12. A device as set forth in claim 11 wherein the body is arranged relative to the beam to cause the latter to reflect plural times from the said reflecting surface.

13. An electrical device adapted for the detection of radiation, comprising a semiconductive body substantially transparent to the said radiation beam and having a receiving surface arranged to admit the said beam to the body interior and a reflecting surface arranged to internally reflect said beam at least once, means including a field plate electrically insulated from and on the reflecting surface for establishing a space charge region within the body at the said reflecting surface, means for passing current through the body, and means for measuring the change in conductivity in the space charge region due to excitation of surface states of the semiconductor.

14. A device as set forth in claim 13 wherein the body funnels down from the admitting surface to form a narrow channel region.

References Cited by the Examiner

UNITED STATES PATENTS

| | | | |
|---|---|---|---|
| 2,692,952 | 10/1954 | Briggs | 88—61 X |
| 3,158,746 | 11/1964 | Lehovec | 88—61 |
| 3,183,359 | 5/1965 | White | 88—61 |

OTHER REFERENCES

Gibson: Electronics, vol. 27, No. 10, October 1954, pages 155 to 157 incl.

Gibson: Journal of Scientific Instruments, vol. 35, August 1958, pages 273 to 278 incl.

Harrick: Physical Review, vol. 103, No. 5, Sept. 1, 1956, pages 1173 to 1181 incl.

DAVID H. RUBIN, *Primary Examiner.*

MAYNARD R. WILBUR, JEWELL H. PEDERSEN, *Examiners.*

R. L. WIBERT, *Assistant Examiner.*